United States Patent
Järvinen et al.

(10) Patent No.: US 11,893,115 B2
(45) Date of Patent: Feb. 6, 2024

(54) METHOD FOR PROVIDING A SECRET UNIQUE KEY FOR A VOLATILE FPGA

(71) Applicant: XIPHERA OY, Espoo (FI)

(72) Inventors: Kimmo Järvinen, Espoo (FI); Matti Tommiska, Espoo (FI)

(73) Assignee: XIPHERA OY, Espoo (FI)

( * ) Notice: Subject to any disclaimer, the term of this patent is extended or adjusted under 35 U.S.C. 154(b) by 441 days.

(21) Appl. No.: 17/293,662

(22) PCT Filed: Nov. 12, 2019

(86) PCT No.: PCT/FI2019/050803
§ 371 (c)(1),
(2) Date: May 13, 2021

(87) PCT Pub. No.: WO2020/099718
PCT Pub. Date: May 22, 2020

(65) Prior Publication Data
US 2022/0012338 A1 Jan. 13, 2022

(30) Foreign Application Priority Data
Nov. 14, 2018 (FI) .................. 20185962

(51) Int. Cl.
*G06F 21/57* (2013.01)
*G06F 21/44* (2013.01)
(Continued)

(52) U.S. Cl.
CPC .......... *G06F 21/57* (2013.01); *G06F 21/44* (2013.01); *G06F 21/6218* (2013.01); *G06F 21/64* (2013.01)

(58) Field of Classification Search
CPC ...... G06F 21/57; G06F 21/44; G06F 21/6218; G06F 21/64
See application file for complete search history.

(56) References Cited

U.S. PATENT DOCUMENTS 8,863,230 B1 * 10/2014 Knapp .................. G06F 21/73
713/168
10,606,764 B1 * 3/2020 Kravit ............... G06F 11/1608
(Continued)

FOREIGN PATENT DOCUMENTS

| EP | 1170868 | 1/2002 |
| EP | 2056230 | 5/2009 |
| GB | 2513265 | 10/2014 |

OTHER PUBLICATIONS

Kashyap et al., "Compact and On-the-Fly Secure Dynamic Reconfiguration for Volatile FPGAs", ACM Transactions on Reconfigurable Technology and Systems, vol. 9, No. 2, Jan. 12, 2016 (Jan. 12, 2016), pp. 1-22, XP055635049.
(Continued)

*Primary Examiner* — Vance M Little
(74) *Attorney, Agent, or Firm* — NIXON & VANDERHYE

(57) ABSTRACT

A method for providing a secret unique key for a volatile FPGA uses layers of encryption with different and independent keys and the possibility to store auxiliary data in the configuration memory. The configuration may be stored in a bit-file protected using hardwired bit-file encryption. The configuration includes a security block with an embedded group key used for protecting the auxiliary data. In the beginning, the auxiliary data may include a specific field with null identifier, which indicates that the device has not been initialized. During the initialization, the device generates a unique key and sets the field to specific identifier, which indicates that the device has been initialized, and replaces the original auxiliary data in the non-volatile configuration memory with a new auxiliary data constructed
(Continued)

from these values. During normal operation this key is fetched from the auxiliary data and used to build a root-of-trust.

21 Claims, 3 Drawing Sheets

(51) Int. Cl.
*G06F 21/62* (2013.01)
*G06F 21/64* (2013.01)

(56) References Cited

U.S. PATENT DOCUMENTS

| | | | |
|---|---|---|---|
| 2001/0037458 A1* | 11/2001 | Kean | G06F 21/76 713/193 |
| 2001/0047473 A1* | 11/2001 | Fallon | G06F 3/0613 713/2 |
| 2014/0122881 A1 | 5/2014 | Cizas et al. | |
| 2015/0100793 A1 | 4/2015 | Newell | |
| 2015/0242620 A1* | 8/2015 | Newell | G06F 21/76 726/30 |
| 2018/0101689 A1 | 4/2018 | Arnold et al. | |
| 2018/0157839 A1* | 6/2018 | Pearson | G06F 21/602 |

OTHER PUBLICATIONS

International Search Report and Written Opinion of the ISA for PCT/FI2019/050803, dated Feb. 5, 2020, 10 pages.
Written Opinion of the IPEA for PCT/FI2019/050803, dated Apr. 30, 2020, 7 pages.
Search Report for FI20185962, dated Jun. 14, 2019, 1 page.
Parrinha et al., "Flexible and low-cost HSM based on non-volatile FPGAs", 2017 International Conference on ReConFigurable Computing and FPGAs (ReConFig), IEEE, XP033313031, Dec. 4, 2017, pp. 1-8.
Wilkinson, "Using Encryption and Authentication to Secure an UltraScale/UltraScale+ FPGA Bitstream", Oct. 12, 2018, XP055662649, pp. 1-26.
Kashyap et al., "Compact and On-the-Fly Secure Dynamic Reconfiguration for Volatile FPGAs", ACM Transactions on Reconfigurable Technology and Systems, vol. 9, No. 2, Jan. 12, 2016 (Jan. 12, 2016), pp. 1-22, XP055635049 (submission pending).

* cited by examiner

METHOD FOR PROVIDING A SECRET UNIQUE KEY FOR A VOLATILE FPGA

This application is the U.S. national phase of International Application No. PCT/FI2019/050803 filed 12 Nov. 2019, which designated the U.S. and claims priority to FI Patent Application No. 20185962 filed 14 Nov. 2018, the entire contents of each of which are hereby incorporated by reference.

FIELD

The invention relates to volatile FPGAs, and in particular, to generating non-volatile unique cryptographic keys for such FPGAs.

BACKGROUND INFORMATION

Field Programmable Gate Arrays (FPGAs) are digital integrated circuits which can be programmed by a designer after manufacturing. The nature of this programming differs significantly from other programmable circuits (e.g. microprocessors) which rely on specific hardwired instruction sets and where programs are specific sequences of these instructions. FPGAs, on the other hand, contain an array of programmable logic blocks and programmable interconnections between them, which allow programming at the logic level and, hence, from a designer's view point, FPGAs can be thought of as "programmable silicon".

The FPGA may be (re)programmed with a configuration file called bit-file, which describes the functions of the logic blocks and interconnections. When the bit-file is uploaded into the FPGA, it configures the FPGA with application logic that implements the functionalities required by the system. The bit-file itself may be a) stored into a non-volatile memory, such as Flash memory, on the same system or b) uploaded from external source. The system can be configured to implement multiple different functionalities by using different bit-files. The non-volatile memory may allow storing multiple bit-files at the same time and can be used also for storing auxiliary data used by any application logic running on the FPGA.

Most FPGAs on the market today are based on volatile technology, which means that an FPGA loses its state when the operation power is switched off. Next time when the power is turned on again, the FPGA returns to the original state described by the bit-file and it cannot return to the same state where it was before the power was turned off. This has severe consequences for using FPGAs as cryptographic root-of-trusts. In particular, any of the secret keys and other sensitive data derived during the operation of the FPGA cannot be restored.

Modern FPGAs from major vendors allow using bit-file encryption, which means that the bit-file stored into the Flash memory may be encrypted with cryptographically strong methods. Bit-file encryption is based on a decryption module which is embedded hardwired part of the FPGA and includes a hardwired decryption key. The decryption module verifies the integrity of the bit-file and decrypts it before the FPGA configures itself with it to implement the application logic. Bit-file encryption prevents an adversary, who can read the contents of the Flash memory, from obtaining the actual bit-file or using the bit-file in an FPGA which does not have the same hardwired decryption key in its decryption module, unless the adversary can break the encryption which is assumed computationally impossible. Consequently, bit-file encryption can be used for preventing reverse-engineering and for anti-counterfeiting purposes.

A cryptographic root-of-trust is a certain set of critical security functions and pieces of information that enable building trust on a device. A root-of-trust allows, for example, a device to securely authenticate itself to other parties or to perform various other cryptographic functionalities and protocols. Ultimately, a root-of-trust requires the device to have a secret unique key that must be embedded into the device so that it cannot be obtained or modified by any unauthorized party (an adversary). This secret unique key (or other cryptographic keys derived from it) allows building various security protocols.

However, in practice, manufacturing processes of mass-market products may require that all devices are manufactured the same way. Thus, each device may have to have exactly the same bit-file and possible auxiliary data written into the configuration memory during manufacturing. At the same time, it may be desirable that the devices can be built from off-the-shelf components; that is, the root-of-trust can be constructed from FPGAs and the Flash memories that are on the market today. Additionally, the use of other components besides the FPGA and Flash memory may not be desirable because it adds costs of the device. These aspects create a conflict with the requirement of having a secret unique key for every device.

BRIEF DISCLOSURE

An object of the present disclosure is to provide method for providing a secret unique key for a volatile FPGA so as to alleviate the above disadvantages. The object of the disclosure is achieved by a method which is characterized by what is stated in the independent claims. The preferred embodiments of the disclosure are disclosed in the dependent claims.

A method according to the present disclosure uses layers of encryption with different and independent keys and the possibility to store auxiliary data in the configuration memory to overcome the aforementioned obstacles. The configuration may be stored in a bit-file protected using hardwired bit-file encryption offered by modern off-the-shelf FPGAs. The configuration includes a security block which has an embedded group key that is, in turn, used for protecting the auxiliary data. In the beginning, the auxiliary data may include a specific field with null identifier, which indicates that the device has not been initialized. During the initialization, the device generates a unique key and sets the field to specific identifier, which indicates that the device has been initialized, and replaces the original auxiliary data in the non-volatile configuration memory with a new auxiliary data constructed from these values. During normal operation this key is fetched from the auxiliary data and used to build a root-of-trust.

The method a) allows each device to have a secret unique key, b) allows each device to be configured with the same bit-file and to have the same auxiliary data stored to the configuration memory during manufacturing, and c) does not require any additional components besides an off-the-shelf FPGA and a non-volatile configuration memory.

BRIEF DESCRIPTION OF THE DRAWINGS

In the following the invention will be described in greater detail by means of preferred embodiments with reference to the attached drawings, in which.

DETAILED DISCLOSURE

Figure 1:
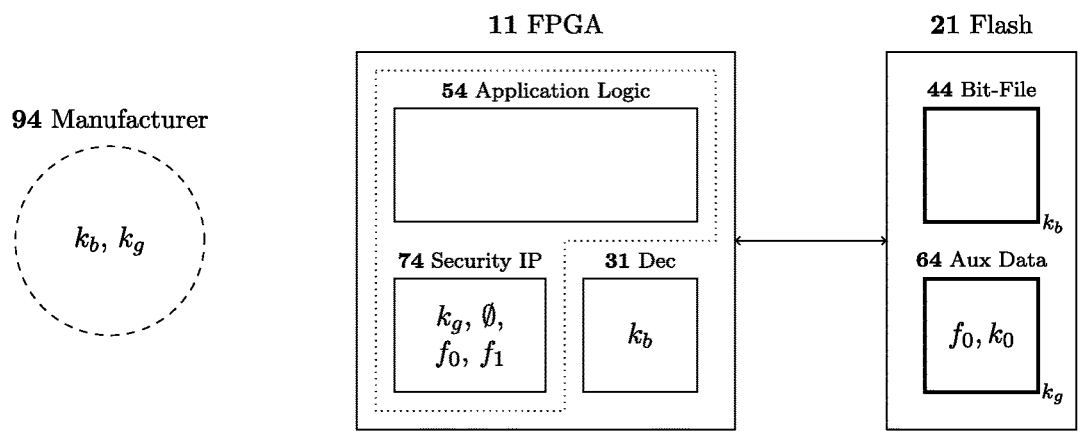
FIGS. 1, 2, and 3 show simplified diagrams of a first embodiment of a basic FPGA system implementing a method according to the present disclosure.

The present disclosure describes a method for providing a secret unique key for a volatile FPGA. The method comprises programming the FPGA to implement application logic comprising a security IP block. The security IP block embeds a value for a group key and a default value of an initialization state indicator. The default value represents an uninitialized state of the FPGA where no secret unique key has been generated before.

A set of method steps are then performed with the security IP block implemented on the FPGA. The security IP block retrieves a value of a data record from a non-volatile memory. The data record has been encrypted and authenticated with a key or keys derived from the group key and represents values of the secret unique key and the initialization state indicator. The security IP block decrypts the value of the data record with the key derived from the group key and determines an initialization status on the basis of the retrieved value of the initialization state indicator. The initialization status is selected from a list comprising at least a) the uninitialized state as discussed above and b) an initialized state where a secret unique key has been generated before.

If the determined initialization status represents the uninitialized state, the security IP block generates a new value for the secret unique key and sends a specific value derived from the new value of the secret unique key to be received by an external validation system. In this context, "a secret unique key" should be understood as "at least one secret unique key". In other words, the security IP block may generate a plurality of new values for a plurality of secret unique keys.

The new value for the secret unique key may be performed with a true random number generator (TRNG) programmed on the FPGA as a part of the security IP block, for example. The external validation system may be a server set up by the manufacturer, for example, and the security IP block may be configured to communicate with the external validation system via communication means accessible by the FPGA implementing the security IP block. The output from the TRNG may be further entered into a deterministic algorithm possibly together with additional data that varies between different devices (MAC address, public identifiers, outputs from physically unclonable functions, etc.).

The security IP block then waits to receive a validation signal for the specific value from the external validation system. The validation signal indicates that the specific value has been successfully validated by the external validation system. If the security IP block receives a signal validating the secret unique key, it stores a new value for the data record to the non-volatile memory. This new value represents the generated new value of the secret unique key and initialized state of the initialization state indicator. The security IP block encrypts and authenticates the generated new value of the data record with the group key.

Figure 2:
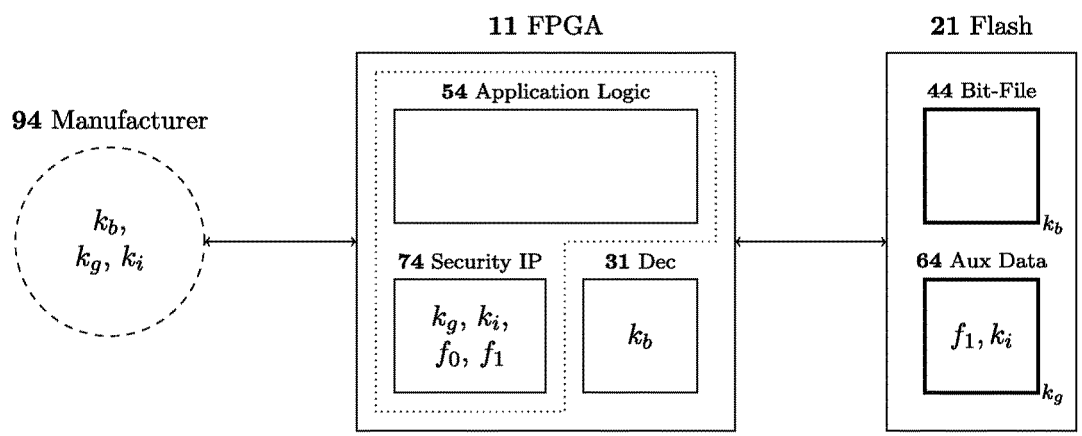
Figure 3:
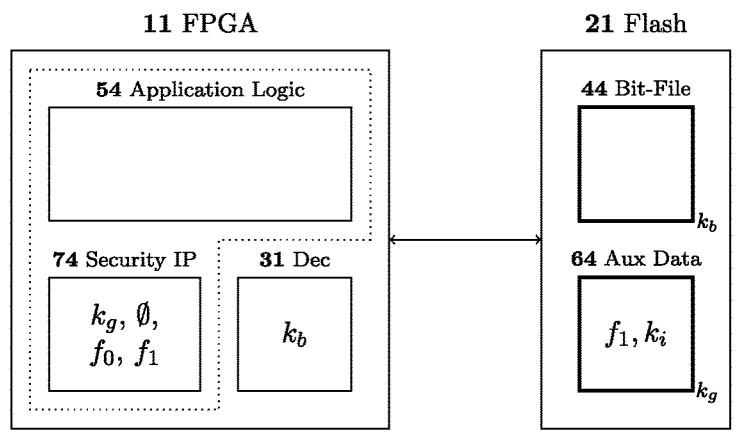

In a preferred embodiment of a method according to the present disclosure, the FPGA is programmed with a bit-file stored in a non-volatile configuration memory. The data record holding the stored value of the secret unique key may be stored separately from the bit-file on the same non-volatile configuration memory. In addition to memory space for storing the bit-file, the configuration memory may further comprise additional memory space for storing auxiliary data. The data record may form a portion (or all) of this auxiliary data. FIGS. 1, 2, and 3 show simplified diagrams of a first embodiment of a basic FPGA system implementing a method according to the present disclosure. The physical components of the system are a volatile FPGA 11 and a non-volatile configuration memory 21 which may be a Flash memory, for example.

The FPGA 11 is (re)programmed with a bit-file 44, which describes the functions of the logic blocks and interconnections. When the bit-file 44 is uploaded into the FPGA 11, it configures the FPGA 11 with application logic 54 that implements the functionalities required by the system.

In FIGS. 1, 2, and 3, the bit-file 44 itself is stored on the configuration memory 21. The system may be configured to implement multiple different functionalities by using different bit-files. The configuration memory 21 may allow storing multiple bit-files at the same time. The configuration memory 21 is also able to store auxiliary data 64 used by any application logic 54 running on the FPGA 11.

As discussed above, modern FPGAs allow using bit-file encryption. The FPGA and the non-volatile configuration memory may implement an encrypted communications interface between each other, and the programming of the FPGA may be performed via the encrypted communications interface. In FIG. 1, the bit-file 44 stored on the configuration memory 21 is encrypted with cryptographically strong methods. The bit-file encryption in FIG. 1 is based on a decryption module 31 which is an embedded, hardwired part of the FPGA 11 and includes a hardwired decryption key $k_b$. The decryption module 31 verifies the integrity of the bit-file 44 and decrypts it before the FPGA 11 configures itself with it to implement the application logic 54. FIGS. 1, 2, and 3 depict encrypted data with a thick line and a key symbol in the lower right corner denoting the key that can decrypt it correctly. The bit-file encryption prevents an adversary who can read the contents of the configuration memory 21, from obtaining the actual bit-file or using the bit-file in an FPGA which does not have the same $k_b$ in its decryption module, unless the adversary can break the encryption which is assumed computationally impractical.

In FIGS. 1, 2, and 3, the auxiliary data 64 comprises the data record that represents values of the secret unique key and the initialization state indicator. The initialization state indicator may be in the form of a separate indicator field within the data record. For example, the data record in the auxiliary data 64 may include an identifier field $f_i$, which is set to a specific null value $f_0$ in the beginning, a key field set to null key value $k_0$, and other relevant data for the method. The auxiliary data 64 may be protected with a group key $k_g$. In the context of the present disclosure, the term 'protected' means that the confidentiality and integrity of the data are both ensured with cryptographic techniques. The cryptographic keys for these are derived from a common seed key mentioned in the same context.

Alternatively, or in addition, the value of the secret unique key itself may serve as the initialization state indicator. A predetermined value of the secret unique key may be stored on the data record, and this predetermined value may be used to indicate the unitialized state, i.e. that a secret unique key has not been generated before.

FIGS. 1 and 2 also show an external validation system 94. The external validation system 94 represents a trusted external party, e.g. the manufacturer, who knows both $k_b$ and $k_g$. The manufacturer is not a component on the device as everything else depicted in the FIGS. 1, 2, and 3. All FPGAs, which share the same bit-file encryption key $k_b$, are called the batch. All devices, which share the same group key $k_g$, are called the group. In the context of the present disclosure, the batch and the group may or may not be the same set of devices. fiNext, operation of the basic system as shown in FIGS. 1, 2, and 3 is discussed in more detail.

FIG. 1 depicts the situation when the FPGA system in FIGS. 1, 2, and 3 is powered up for the first time after manufacturing. In FIG. 1, a bit-file 44 and initial contents of the auxiliary data 64 has been written to the configuration memory 21. The same bit-file and initial contents of auxiliary data may be written to the configuration memory for every device during manufacturing and, therefore, they may be the same for all devices when the power is switched on for the first time.

First, in order to program the FPGA to implement application logic comprising the security IP block, the decryption module 31 receives the bit-file 44 from the configuration memory. If the decryption module 31 successfully verifies and decrypts the bit-file 44 with $k_b$, then it configures the FPGA 11 with it. After this, the FPGA has a configuration with user-defined application logic 54 and a security IP block 74. The user-defined application logic 54 may be freely configured. The user-defined application logic 54 does not directly relate to the method according to the present disclosure and is therefore not discussed in further detail in this disclosure. The security IP block 74 embeds the group key $k_g$ and two specific identifier values $f_0$ and $f_1$ (e.g., bit 0 and bit 1, respectively) which indicate that the device has not or has been initialized, respectively. The Security IP block 74 includes also secure key storage, which may be left empty (Ø) in the configuration. This key storage is dedicated for the secret unique key $k_i$.

After the power-up, the auxiliary data 64 comprising the data record is retrieved from the configuration memory 21 to the Security IP block 74 either by the Security IP block 74 directly or via application logic 54. Because the Security IP block 74 has the group key $k_g$, it can verify and decrypt the auxiliary data 64 and obtain the identifier and key from it. The Security IP block 74 may then determine the initialization status by comparing the identifier $f_i$ from the auxiliary data with the null value $f_0$ that is embedded in it. Because the data record in the auxiliary data 64 is still the original version that was written during manufacturing, this comparison returns 'true'. The initialization status thus represents the unitialized state and the Security IP block 74 starts an initialization process. In the context of the present disclosure, the term "initialization process" is intended to be understood as the method steps aiming to successfully generate, validate, and store a secret unique key for the FPGA.

FIG. 2 shows the beginning of the initialization process. The Security IP block 74 generates a random secret unique key $k_i$ (a λ-bit random value, where λ depends on the security level of the application; e.g., 128 or 256 bits). In order to derive $k_i$, the Security IP block 74 may comprise a true random number generator (TRNG), for example. The Security IP block 74 may then generate a new value for the data record in the auxiliary data 64. The security IP block 74 protects auxiliary data 64 updated with the new value of the data record by using the group key $k_g$. The new value of the data record contains or embeds initialization state indicator indicating the initialized state ($f_i=f_1$) and the new value of the secret unique key $k_i$, as shown in FIG. 2. The data record may further represents additional other cryptographic keys and/or other data.

FIG. 2, the Security IP block 74 sends the secret unique key $k_i$ to be received by the external validation system 94 (e.g. the manufacturer) which may store it into a list for all devices. For devices i=1, . . . , n, this list could be, for example, the following list of tuples $(1, k_1), (2, k_2), \ldots, (n, k_n)$. However, instead of communicating $k_i$, the FPGA system may also communicate some other values. In particular, the external validation system 94 may obtain a specific value derived from $k_i$ and not $k_i$ itself. One notable example is that the device may compute a public key from $k_i$ using a specific public key cryptosystem and reveal only the public value, while keeping the secret key $k_i$ for itself and in the data record stored in the non-volatile memory.

The security IP block 74 may encrypt and authenticate the new value of the secret unique key (or the specific value derived from the new value) with a key derived from with either a shared secret key or a public key of the external validation system key before sending the specific value to be received by the external validation system. However, in embodiments where the first power-up can be assumed to occur in a safe environment, it may not be necessary to encrypt and authenticate the specific value sent to the external validation system 94.

The Security IP block 74 then waits to receive a validation signal from the external validation system 94. When the external validation system 94 informs that it has successfully received $k_i$, the updated value of the auxiliary data 64 is written into the configuration memory 21.

When the power is switched off in FIG. 2, the FPGA 11 loses its configuration and all values derived during its previous operation. Hence, the FPGA 11 also loses the knowledge of the secret unique key $k_i$ that was generated during the initialization process.

FIG. 3 shows the situation at a second (or a subsequent power-up) after the FPGA system has been successfully initialized. After the next power-up, the FPGA system obtains the configuration shown in FIG. 3. The difference compared to the original state after manufacturing depicted in FIG. 3 is that the original contents of the auxiliary data 64 has been replaced by the new contents including the new value of the data record as described above. The difference in FIG. 3 compared with the state after initialization process shown in FIG. 2 is that the Security IP block 74 within the FPGA 11 does not have the secret unique key $k_i$. Similar to FIG. 2, the auxiliary data 64 is retrieved from the configuration memory 21 to the security IP block 74 in FIG. 3. The security IP block 74 verifies and decrypts it and obtains the key $k_i$. The security IP block 74 compares the identifier $f_i$ and the embedded null identifier $f_0$. Now, $f_i=f_1$ because the device has been initialized and, consequently, the comparison returns 'false'. Hence, the security IP block 74 enters normal operation instead of initialization process. Throughout this disclosure, the term "normal operation" is used to refers to operation of the security IP block after a secret unique key has been successfully generated, validated and stored on the non-volatile memory. The "normal operation" may involve the security IP block communicating with the user-defined application logic, for example.

The normal operation allows using $k_i$ for cryptographic root-of-trust. The secret key $k_i$ is embedded into the security IP block 74 in a way that prevents the adversary from obtaining it. In particular, the normal operation prevents communication that was used for communicating the specific value derived from the secret unique key $k_i$ to the external validation system during the initialization process.

The security IP block 74 may be designed in a way that $k_i$, $k_g$, or any cryptographic key material derived from them does not leak to an external adversary who can be either passively observing or actively tampering with the FPGA. Furthermore, it is also assumed that the bit-file encryption can resist attempts from such an adversary.

While the first embodiment in FIGS. 1, 2, and 3 uses of a security IP block with a TRNG, the method according to the present disclosure may also be implemented in the form of a second embodiment where the security IP block that does not include a TRNG. Because such a security IP block is not able to generate any true randomness, it is not able to derive a secret unique key $k_i$. It can still derive pseudorandom values from any seed value (e.g., $k_g$), but they are not unique between different instances using the same seed (that is, between devices using the same configuration bit-file). The second embodiment may differ from the first embodiment only in the initialization process. In the second embodiment, when the Security IP block enters the initialization process, it first waits to receive a message from an external party (e.g. the manufacturer or other trusted external party) who knows $k_g$. This message may include the secret unique key $k_i$ generated by the external party and protected with $k_g$. That is, the message may contain a value of the data record to be used as (at least part of) contents of the new auxiliary data. When the security IP block receives the message, it verifies the authenticity of the message. If the verification is successful, the security IP block updates the auxiliary data in the configuration memory. In the second embodiment, there is no need to communicate $k_i$ to the external validation system.

Further, while the first embodiment in FIGS. 1, 2, and 3 implements an encrypted communications interface between the FPGA 11 and the configuration memory 21, the FPGA and the non-volatile configuration memory may instead implement a non-encrypted communications interface between each other. This may be the case when an FPGA does not support bit-file encryption, for example. Thus, in a third embodiment, the FGPA does not have the hardwired decryption module and bit-file is stored on the configuration memory unencrypted. The security of this variation relies only on the hardness of accessing the contents of the configuration memory and on the difficulty of reverse-engineering the configuration and, specifically, $k_g$ from the bit-file. Hence, protection of the group key is based on obfuscation in the third embodiment.

In the first embodiment, the application logic 54 and the security IP block 74 are implemented with a single bit-file 44. However, in a fourth exemplary embodiment, the implementation of the security IP block comprises a first block for the initialization process and a second block for normal operation after the initialization. In other words, the first block is dedicated to perform the initialization process as discussed above and the second block is dedicated to be used in the normal operation. The manufacturer creates two bit-files: a first bit-file comprising the first block and a second bit-file comprising the second block. Then, the FPGA system may first be programmed with the first bit-file which executes the method up to the point shown in FIG. 2. After this, the manufacturer may write the second bit-file but keep the contents of the auxiliary data 64 as it is after the initialization process. The second bit-file may then be used during the normal operation. The fourth exemplary embodiment allows saving of FPGA resources because the normal operation does not need to be supported in the first block and the initialization process in the second block. On the other hand, the potential savings in required FPGA resources come at the cost of maintaining two bit-files and updating the bit-file between the initialization process and the normal operation.

The above exemplary embodiments and the method according to the present disclosure more generally directly extend to other cryptographically relevant data used within the FPGA. The non-volatile memory may be used to further store other cryptographic key data and/or other data. Such data could be long-term secret keys, certificates, counters (for instance, to ensure uniqueness of nonces), etc. The data can be stored in the auxiliary data similarly as the secret unique key $k_i$ and protected with $k_g$. Different parts of the auxiliary data may also be protected with different keys. In that case, another key $k_j$ is generated either from $k_g$ or $k_i$ or generated directly from the TRNG and protected either with $k_g$ or $k_i$ in the auxiliary data. The new key $k_j$ may be used for protecting another region of the auxiliary data. This enables, for example, delegating access to this part of the auxiliary data to another block in the same FPGA by transferring it the key to this part (that is, $k_j$).

In some embodiments, the non-volatile configuration memory is integrated to the FPGA. Some modern FPGA devices include non-volatile memory in an otherwise volatile device. If such non-volatile memory is available in the FPGA, the method may be used so that the auxiliary data (and possibly also the bit-file) may be stored within this internal non-volatile memory instead of the external configuration memory. This extension does not require any modifications to other parts of the method; that is, only the location of the auxiliary data is changed.

The present disclosure further discloses a non-volatile configuration memory and a configuration program product for implementing the above-discussed method for configuring a volatile FPGA, including the exemplary embodiments of the method as described above.

In an exemplary embodiment of a non-volatile configuration memory according to the present disclosure, the non-volatile configuration memory may be in the form of a physical memory component, such as a Flash memory component. The non-volatile configuration memory may be used in a device comprising the configuration memory and a volatile FPGA that is configured to receive its configuration from the configuration memory, for example. The non-volatile memory contains a bit-file, wherein the bit-file is configured to program the FPGA to implement a security IP block that embeds a value for a group key and a default value of an initialization state indicator. The default value represents an uninitialized state where no secret unique key has been generated before.

The security IP block is further configured to retrieve a value of a data record from the configuration memory (or other non-volatile memory), decrypt the value of the data record with the key derived from the group key, and determine an initialization status on the basis of the retrieved value of the initialization state indicator. The security IP block assumes that data record has been encrypted and authenticated with a key derived from the group key and represents values of the secret unique key and the initialization state indicator. The initialization status is selected from a list comprising at least the uninitialized state and an initialized state where a secret unique key has been generated before.

The security IP block is configured to generate a new value for the secret unique key, send a specific value derived from the new value of the secret unique key to be received by an external validation system, and wait to receive a validation signal for the specific value from the external validation system, if the determined initialization status represents the uninitialized state. The validation signal indicates that the specific value has been successfully validated by the external validation system.

The security IP block is configured to store a new value of the data record to the configuration memory (or said other non-volatile memory), if it receives a signal validating the unique secret key. Said new value of the data record represents the generated new value of the secret unique key and initialized state of the initialization state indicator, and is encrypted and authenticated with the group key.

In an exemplary embodiment of a configuration program product according to the present disclosure, the configuration program product is configured to program the FPGA to implement a security IP block that embeds a value for a group key and a default value of an initialization state indicator, wherein the default value represents a uninitialized state where no secret unique key has been generated before. The security IP block may be further configured to implement the method according to the present disclosure. For example, the security IP block may be the same as defined in reference to the non-volatile configuration memory according to the present disclosure.

The method according to the present disclosure, including the embodiments above, may be used in different applications.

One exemplary use of the method according to the present disclosure is that when a manufacturer sells the device to a customer, it may send the list of $k_i$ for the purchased devices together with the physical devices to the customer. Hence, the customer can utilize the features provided by the root-of-trust based on the secret unique key $k_i$. However, if the manufacturer withholds $k_i$, then the root-of-trust can be used only by the manufacturer and this allows, for example, tracking the use of the devices.

Another example of the possible use cases is the following: if the device and a remote server both share the same $k_i$, they can run a challenge-response protocol where the server sends a challenge to the device who then generates a response depending on both the challenge and $k_i$. When the server receives the response from the device, it knows that it came from a legitimate source because generating the same response is impossible without knowing $k_i$. This disclosure describes a method for deriving and storing a unique cryptographic key (or keys) that can be used in a root-of-trust module and covers all root-of-trust or other cryptographic functionalities that can be built upon such secret keys; that is, the method is not tied to any specific root-of-trust functionality.

In the following, some specific aspects related to the method according to the present disclosure are discussed in more detail.

A first specific aspect is cryptographic primitives. The method can be implemented with various cryptographic primitives. The primary requirements for protection are that they must ensure confidentiality and integrity of data under active adversaries. That is, an adversary who can read the data stored in the non-volatile configuration memory shall not be able to find out the cryptographic keys: $k_b$, $k_g$, $k_i$, or any secrets derived from them.

Any manipulation of the data by an active adversary tampering with the contents of the non-volatile configuration memory shall also not remain unnoticed or give an adversary any advantage in finding the secret keys. The decryption using $k_b$ is assumed hardwired into the FPGA and is not consider further here.

In the following, two examples are given for achieving these objectives. These are used particularly for protecting the auxiliary data (that is, $k_i$), but they serve additional purposes also and can be used as part of any further application that builds on the method. Both examples are built on Encrypt-then-MAC (Message Authentication Code) scheme for authenticated encryption, but also MAC-then-Encrypt and Encrypt-and-MAC can be used with minor modifications. The following examples use separate encryption and authentication keys $k_e$ and $k_a$, respectively. They are both derived from the secret unique key $k_i$ via a cryptographically secure key derivation function (KDF). The examples are designed so that they use only one cryptographic primitive, in this case AES (Advanced Encryption Standard) and HMAC-SHA-256 (hash-based message authentication code, where SHA-256 is the cryptographic hash function) respectively, to save implementation area on the FPGA. Other instantiations are certainly possible, for example, using AES-GCM (Advanced Encryption Standard—Galois/Counter Mode).

In Example 1, the main cryptographic primitive is a block cipher. The following description assumes that the block cipher is Advanced Encryption Standard (AES) but, in principle, any secure block cipher could be used instead. AES is a block cipher that encrypts a 128-bit message block with either 128, 192, or 256 bit keys. The confidentiality requirement is ensured by encrypting $k_i$ with AES by using an encryption key $k_e$ and a secure mode of operation such as Cipher-Block-Chaining (CBC) or Counter (CTR) mode. In the following, AES-128-CTR is considered without loss of generality. The CTR mode encrypts a message m by splitting it into 128-bit blocks $m_0, m_1, \ldots, m_{M-1}$, where M is the smallest multiple of 16 bytes that is larger than the length of the plaintext (in bytes), and by computing $$c_i = E_{k_e}(b_i) \oplus m_i \text{ for all } i=\{0,1,\ldots,M-1\}, \quad (1)$$

where $E_{k_e}$ is AES with the key $k_e$, $b_i = b_0 + i$, and $\oplus$ is the bitwise exclusive-or (xor). Decryption is similar to Eq. (1), but $c_i$ and $m_i$ switch places. It is essential that the counter block $b_i$ is a nonce (that is, a value that is never reused) for one key and, hence, $b_0$ must be chosen either as a) a large random value or b) a counter so that $b_0$ is always one greater than the last $b_i$ of the previous encryption.

Integrity is ensured by computing an authentication tag T for S, which are all public values (nonces, initialization vectors, etc.), and the ciphertext $c = c_0 \| c_1 \| \ldots \| c_{M-1}$ by using an authentication key $k_a$ and, for example, CMAC (Cipher-based Message Authentication Code). Verification of a ciphertext c and an authentication tag T, first, computes an authentication tag T' using c and $k_a$ and, then, compares T' and T. If they are the same, then verification is successful, otherwise it fails (c and/or T has changed).

Finally, the auxiliary data is formed by concatenating $A = S \| c_0 \| c_1 \| \ldots \| c_{M-1} \| T$. The bit string A is then stored in the configuration memory. The encryption and authentication keys can be derived from $k_i$, for example, via a CMAC based KDF.

In Example 2, the main cryptographic primitive is any pseudorandom function (PRF) F (k, x). In the following, a PRF based on the hash-based message authentication code HMAC and HKDF (a KDF based on HMAC), are considered so that the hash function is SHA-256. If the length of m (as in Example 1) is $\ell$ bits, then an l-bit key is derived from HKDF by using $k_e$ as the key and a random salt from the TRNG. The ciphertext c is computed by xorring the obtained key with m. The authentication tag is computed simply with HMAC using $k_a$ as the key. The auxiliary data is constructed similarly as in Example 1: A=S||c||T. The encryption key $k_e$ and the authentication key $k_a$ are both derived from $k_g$ using HKDF.

Figure 4:
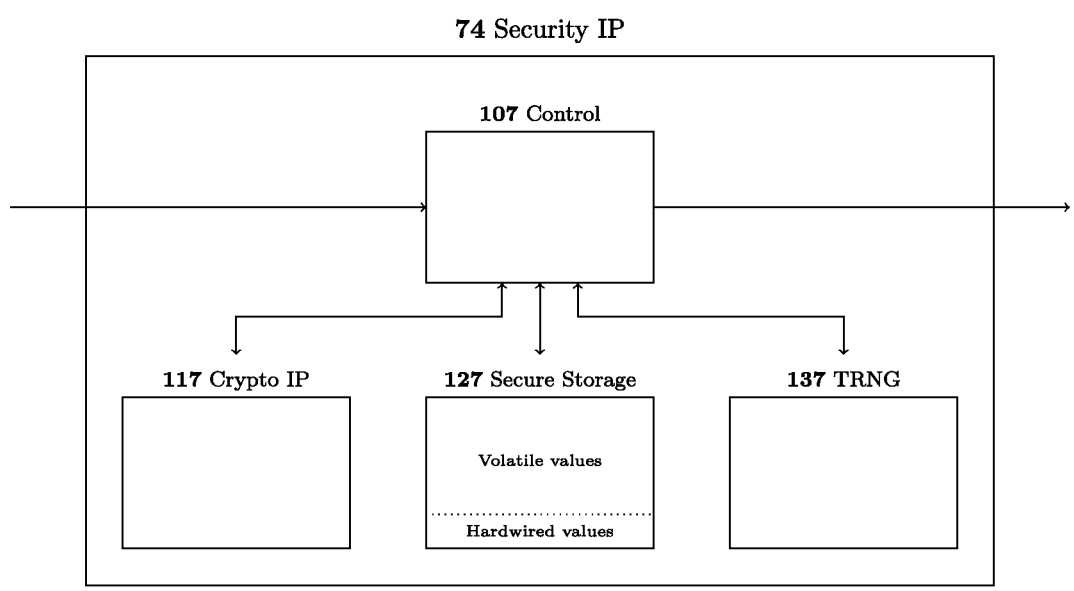
FIG. 4 shows an exemplary, simplified block diagram of the security IP block 74 of FIGS. 1,2, and 3.

Some implementation approaches for a security IP block for a method according to the present disclosure can be seen as a second specific aspect. Some exemplary details of the security IP block therefore are being discussed next. FIG. 4 shows an exemplary, simplified block diagram of the security IP block 74 of FIGS. 1,2, and 3. In FIG. 4, the security IP block 74 consists of four subblocks: a control block 107, a crypto IP block 117, a secure storage block 127, and a TRNG block 137.

Control block 107 takes care of external and internal interface and controls the execution of operations of the other subblocks. It includes a finite state machine (FSM) discussed more closely later on in this disclosure. It also includes logic and wiring for implementing the internal interfaces between the subblocks and the external interface to the application logic 54. All internal interfaces are assumed secure.

Crypto IP block 117 implements the cryptographic primitives as discussed in reference to the first specific aspect. It may comprise a module for computing the cryptographic algorithm (that is, AES in Example 1 and HMAC-SHA-256 in Example 2) on the cryptographic primitives and a control FSM for controlling this module so that it computes the actual cryptographic primitives for confidentiality and integrity. In order to minimize the footprint of the security IP block 74, a compact implementation of the cryptographic algorithm may be required. Literature includes many descriptions of compact FPGA-based AES implementations, but using a high-speed implementation may also be justifiable if high encryption/decryption speeds are needed for other functionalities later on. PRFs can be implemented from FPGA-based hash function implementations. It may require strong countermeasures against side-channel attacks. Such countermeasures are discussed in more detail later on in this disclosure.

The secure storage block 127 may store all values that are needed in the security IP block 74 to implement the method according to the present disclosure. It may split into two parts: one for volatile values and one for hardcoded values. The volatile part is only for storing temporary values and, hence, the values stored there can be lost, when the power is switched off, or are stored in the auxiliary data 64 of non-volatile configuration memory. In particular, the secret unique key $k_i$ (and all keys derived from it) are stored in the volatile values. In this context, "hardcoded values" are values that are directly hardcoded to the configuration of the FPGA and, thus, they are restored every time when the FPGA is re-configured with the bit-file. In principle, these values can be stored so that they can be overwritten with new values during the operation of Security IP block 74, but there is no need for such a feature in the method and the rest of the disclosure assumes that they are static values. In particular, the group key $k_g$ (or values needed to compute it; see below) are stored in the hardcoded values. There are no strict restrictions for the actual techniques used to store values within the secure storage block 127 besides the requirements discussed above and, therefore, the storage can be implemented with flip-flops, embedded memory blocks, LUT memories, initial values, hardcoded wiring, etc., or with any combinations of them.

The TRNG block 137 is a component that generates truly random bits based on entropy that is extracted from truly random physical phenomena. An FPGA-based TRNG may be implemented, for example, by using ring-oscillator banks and the literature includes many instances of practical TRNG with different entropy sources.

Because the method may rely on the bit-file encryption of the FPGA that cannot be controlled by the implementer of the method, it may be important to provide further measures to prevent key leakage even in the case where the adversary breaks bit-file encryption and obtains the bit-file in clear. Obtaining the details of the actual configuration from a bit-file is assumed to be difficult. Nevertheless, the secret hardwired values (that is, the group key $k_g$ or values from which it is derived) of the secure storage which are hardcoded into the configuration should be hidden via obfuscation. In the following, some different strategies to obfuscate $k_g$ (or any other secret value) within the configuration is presented.

In order to obfuscate the value of the group key $k_g$, it is preferably not stored in the bit-file as such. For example, the configuration may not have a hardwired $k_g$, but instead a significantly longer seed value $k_g'$. The actual group key may then be computed from $k_g'$ by using a cryptographically secure compression function. This increases the bits that the adversary needs to find correctly: a mistake even in one bit in $k_g'$ would return a completely incorrect $k_g$·fi Further, the group key $k_g$ may be split using secret sharing into multiple shares $k_g^{(i)}$ for i=1, . . . , s so that $k_g = \bigoplus_{i=1}^{s} k_g^{(i)}$. That is, the group key $k_g$ is a bitwise logical exclusive-or (xor) of all shares. Hence, $k_g$ is never stored in the configuration as such.

In addition, the group key may be split into multiple blocks so that $k_g = k_g^1 || k_g^2 || \ldots || k_g b$. Different blocks may be stored in different locations in the configuration. For example, some are wires hardwired directly to 0 or 1, some are initial values of registers, some are stored in initial configurations of embedded block memories, etc. The blocks are also distributed to different spatial locations within the configuration.

The above strategies may be used alone or they can be combined. As discussed in the fourth embodiment of the method according to the present application, the method is applicable even without bit-file encryption, when this obfuscation is assumed strong enough.

Figure 5:
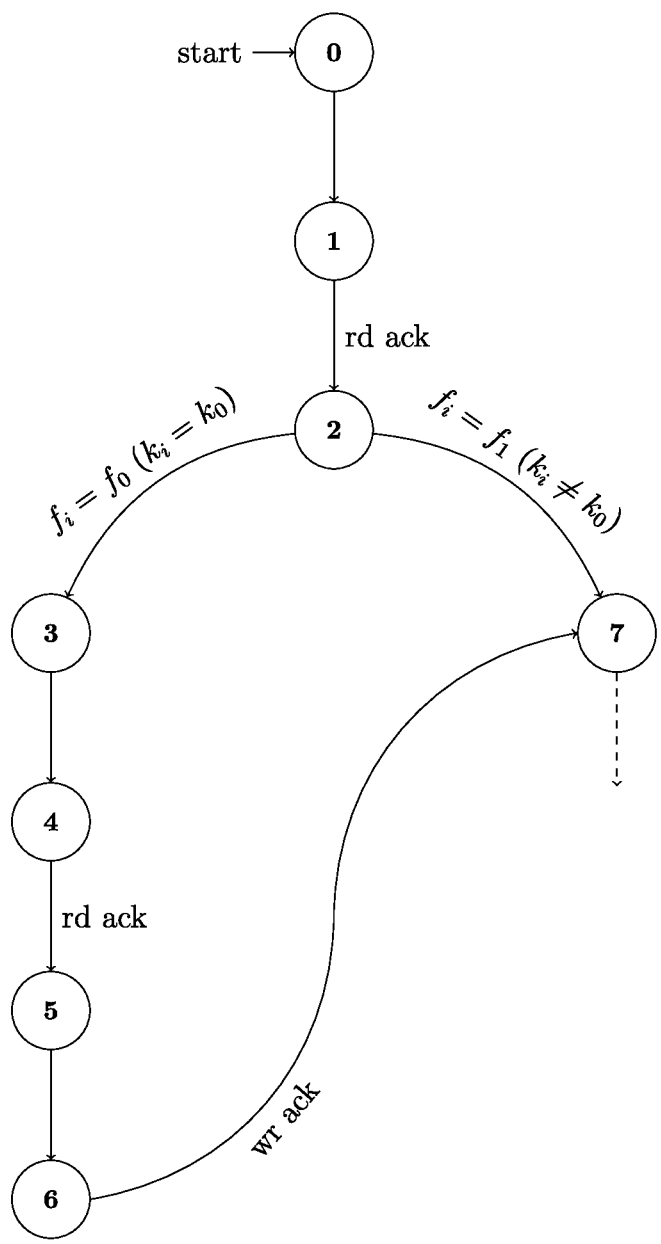
FIG. 5 shows an exemplary, simplified state machine of a security IP block of a method according to the present disclosure.

A third specific aspect is discussion on utilization of TRNG in a method according to the present disclosure. The following presents exemplary approaches for implementing the method with the TRNG as an FSM (finite state machine) that controls the high-level execution of the Control 107 of the Security IP block 74. FIG. 5 shows an exemplary, simplified state machine of a security IP block of a method according to the present disclosure.

In FIG. 5, the state machine comprises eight states (State 0 to State 7). The states are discussed in reference to the first embodiment as described in FIGS. 1, 2, and 3.

State 0 is a power-up state that the state machine enters at power-up. It performs necessary operations and checks for the Security IP block 74 to function properly. The Security IP block 74 may also perform the required operations to construct the group key $k_g$ from obfuscated data (e.g. as discussed above). When these are done, the state machine moves to State 1.

In State 1, the auxiliary data 64 is retrieved from the configuration memory to the security IP block 74. This can be done either via the application logic 54 or directly from the Security IP block 74. After a read acknowledgement, the auxiliary data 64 is available and the state machine moves to State 2.

In State 2, The Security IP block 74 verifies the integrity and decrypts the auxiliary data 64 using Crypto IP 117 and the group key $k_g$. Consequently, it obtains $f_i$, e.g. in a manner described in the first embodiment. If $f_i=f_0$, the security IP block 74 knows that it boots up for the first time and it proceeds to the initialization process by moving to State 3; otherwise, it proceeds to the normal operation in State 7.

In State 3, the Security IP block 74 uses the TRNG 137 to generate a new $k_i$. This may be done by reading random seed bits from the TRNG 137 to collect enough entropy to guarantee certain (e.g., 128-bit) security level. In practice, significantly more bits than the security level can be read in order to increase robustness against environmental changes because this is a one-time operation and, thus, not speed critical. After collecting the seed bits, the unique identity key $k_i$ is generated from the seed bits via the KDF (as defined in the discussion on the cryptographic primitives above, for example) and written into the secure storage block 127. When $k_i$ is ready, the state machine moves to State 4.

In State 4, the security IP block 74 communicates $k_i$ or any specific values derived from it (e.g. a public key) to the manufacturer. This can be done, for example, by writing $k_i$ to a register or memory location which can be accessed externally via the application logic 54. This location is preferably different from the normal storage of $k_i$ within the secure storage block 127 in order to prevent leakage of $k_i$ during the normal operation. Then, the external validation system 94 may use appropriate commands to read $k_i$ and once it has read it, acknowledge that the read was successful and the state machine proceeds to State 5.

In State 5, the Security IP block 74 generates new contents for the auxiliary data 64 by encrypting $k_i$ and $f_i=f_1$ and by calculating the authentication tag (see discussion on the cryptographic primitives above). When every device of a group uses the same group key $k_g$, encryption methods may require unique nonces (i.e., the same value should not be used in two different devices). Hence, the nonce is generated by reading random bits from the TRNG block 137. Because the nonce is long, it is extremely unlikely that the same nonce is used in different devices with practical production volumes. For example, with 96-bit nonces, the Birthday paradox tells that the probability for a collision of nonces becomes larger than 50% only after $2^{48}$ devices (or encryptions). The initial auxiliary data 64 does not have this challenge because its contents are the same for all devices.

When the new content of the auxiliary data 64 is ready, the state machine moves to State 6.

In State 6, the new content of the auxiliary data 64 is written into the configuration memory 21. This can be done either via the application logic 54 or directly from the Security IP block 74. After a write acknowledgement, the initialization process may be considered ready and the state machine may move to State 7.

In State 7, the security IP block 74 enters the normal operation. This state may include, for example, derivation of further keys from $k_i$ for different purposes. This state is followed with further states which, then, implement the functionalities required from the cryptographic root-of-trust, which was initalized with the proposed method. They are no longer part of the method and, thus, not discussed further in this disclosure.

A fourth specific aspect is security rationale in the context of a method according to the present disclosure. A primary security objective of the method is that an adversary with or without physical access to a device shall not obtain the secret unique key $k_i$, which is the basis for the root-of-trust. A secondary security objective is that the adversary shall not be able to make the device to have another $k_i'$ without it being detected in the FPGA. These objectives mandate that also the group key $k_g$ must remain secret because if the adversary finds out $k_g$ from any device, then the adversary can read or manipulate the auxiliary data (that is, $k_i$) of all devices of the group.

The method according to the present disclosure uses layered protection (defence-in-depth) in order to prevent the adversary from breaking the security objectives: a) the bit-file encryption of the FPGA with the bit-file encryption key $k_b$, b) the difficulty of reverse-engineering the configuration and $k_g$ from the bit-file, and c) The protection of the auxiliary data with the group key $k_g$.

These three layers are discussed below in some detail. Although not strictly speaking a part of the method, it is assumed that all further security functions and external communication with cryptographic keys derived from $k_i$ and/or $k_g$ are aimed to ensure that these secrets do not leak to an adversary in order to the security objectives of the method to remain effective.

The first layer, i.e. the bit-file encryption, may be considered only as a barrier that slows down an adversary, not a full protection that prevents all attacks. Nevertheless, the effort that is required from the adversary is considerable and prevents attacks in most imaginable applications.

The second layer involves obfuscation of the configuration, i.e. increasing the difficulty of reverse-engineering the configuration. While it is possible to successfully reverse certain sections of the bit-stream, complete bit-stream reversal remains infeasible for the time being. BRAM (Block Random Access Memory) of the FPGA contents can be read and written. Thus, BRAMs should not be used for storing $k_g$, at least alone.

The third layer, i.e. the protection of the auxiliary data, may involve countering for side-channel attacks. Every time an initialized device is powered up, it verifies and decrypts the auxiliary data 64 using the Crypto IP 117 and the group key $k_g$. Hence, a way for an adversary to attack the device to find out $k_g$ is to repeatedly boot the device and record side-channel traces during the verification and decryption (State 2 in FIG. 5). This threat can be counter-measured with at least two approaches.

First, the Crypto IP block 117 may include strong countermeasures against side-channel and fault attacks so that it is difficult for an adversary to attack the verification and decryption process. In practice, this may mean that these countermeasures significantly increase the number of traces (and the number of times the device needs to be booted).

Second, an artificial delay can be added to the boot-up process (e.g., to State 0 of FIG. 5). The rationale behind this delay is that it hinders the adversaries' efforts to collect side-channel traces. Because a trace is recorded during the operation of Crypto IP 117, the adversary needs to wait this delay every time for each trace. For instance, adding a delay of 10 seconds means that collecting 100000 traces has an additional delay of over 11 days. This delay can be random to make the adversary's efforts even more difficult.

In general, these countermeasures should be such that they make attacking harder than the estimated combined difficulty of attacking the bit-file encryption and reverse-engineering which are out of the control of the device manufacturer and that would also reveal $k_g$ to a successful adversary.

It is obvious to a person skilled in the art that the method/system according to the present disclosure can be implemented in various ways. The invention and its embodiments are not limited to the examples described above but may vary within the scope of the claims.

The invention claimed is:

1. A method for providing a secret unique key for a volatile FPGA, wherein the method comprises
programming the FPGA with a bit-file to implement a security IP block that embeds a value for a group key and a default value of an initialization state indicator, wherein
the bit-file has been encrypted with a bit-file encryption that is decrypted with a hardwired decryption module embedded on the FPGA,
and/or
the group key has been obfuscated within the bit-file, and
wherein the default value represents an uninitialized state where no secret unique key has been generated before; and,
with the security IP block implemented on the FPGA,
retrieving a value of a data record from a non-volatile memory, wherein the data record has been encrypted and authenticated with a key derived from the group key and represents values of the secret unique key and the initialization state indicator;
decrypting the value of the data record with the key derived from the group key;
determining an initialization status on the basis of the retrieved value of the initialization state indicator, the initialization status being selected from a list comprising at least the uninitialized state and an initialized state where a secret unique key has been generated before; and
if the determined initialization status represents the uninitialized state,
generating a new value for the secret unique key,
sending a specific value derived from the new value of the secret unique key to be received by an external validation system,
waiting to receive a validation signal for the specific value from the external validation system, wherein the validation signal indicates that the specific value has been successfully validated by the external validation system; and
if a signal validating the unique secret key is received, storing a new value of the data record to the non-volatile memory, wherein the said value represents the generated new value of the secret unique key and initialized state of the initialization state indicator, and wherein said value is encrypted and authenticated with the group key.

2. The method according to claim 1, wherein the generating of the new value for the secret unique key comprises
generating the new value with a true random number generator (TRNG) programmed on the FPGA as a part of the security IP block.

3. The method according to claim 2, wherein the bit-file is stored in a non-volatile configuration memory, and the stored value of the secret unique key is stored on the same non-volatile configuration memory.

4. The method according to claim 3, wherein the FPGA and the non-volatile configuration memory implement an encrypted communications interface between each other, and the programming of the FPGA is performed via the encrypted communications interface.

5. The method according to claim 3, wherein the FPGA and the non-volatile configuration memory implement a non-encrypted communications interface between each other, and wherein protection of the group key is based on obfuscation.

6. The method according to claim 3, wherein the generating of the new value of the secret unique key comprises generating a plurality of new values for a plurality of secret unique keys.

7. The method according to claim 3, wherein the method further comprises
encrypting and authenticating the specific value derived from new value of the secret unique key with a key derived from a shared secret key or a public key of the external validation system before sending the specific value to be received by the external validation system.

8. The method according to claim 3, wherein the security IP block comprises a first block for initialization and a second block for normal operation after the initialization.

9. The method according to claim 3, wherein the non-volatile memory further stores other cryptographic keys and/or other data.

10. The method according to claim 1, wherein the bit-file is stored in a non-volatile configuration memory, and the stored value of the secret unique key is stored on the same non-volatile configuration memory.

11. The method according to claim 10, wherein the FPGA and the non-volatile configuration memory implement an encrypted communications interface between each other, and the programming of the FPGA is performed via the encrypted communications interface.

12. The method according to claim 10, wherein the FPGA and the non-volatile configuration memory implement a non-encrypted communications interface between each other, and wherein protection of the group key is based on obfuscation.

13. The method according to claim 10, wherein the non-volatile configuration memory is integrated to the FPGA.

14. The method according to claim 1, wherein the initialization state indicator is in the form of a separate indicator field within the data record.

15. The method according to claim 1, wherein the generating of the new value of the secret unique key comprises generating a plurality of new values for a plurality of secret unique keys.

16. The method according to claim 1, wherein the method further comprises
encrypting and authenticating the specific value derived from new value of the secret unique key with a key derived from a shared secret key or a public key of the external validation system before sending the specific value to be received by the external validation system.

17. The method according to claim 1, wherein the security IP block comprises a first block for initialization and a second block for normal operation after the initialization.

18. The method according to claim 1, wherein the non-volatile memory further stores other cryptographic keys and/or other data.

19. A non-volatile configuration memory for configuring a volatile FPGA, wherein the non-volatile memory contains a bit-file, wherein the bit-file is configured to program the FPGA to implement a security IP block that embeds a value for a group key and a default value of an initialization state indicator, wherein the bit-file is encrypted with bit-file encryption that is configured to be decrypted with a hardwired decryption module embedded on the FPGA, and/or the group key is obfuscated within the bit-file, and wherein the default value represents an uninitialized state where no secret unique key has been generated before, and wherein the security IP block is further configured to:
- retrieve a value of a data record from a non-volatile memory, wherein the data record has been encrypted and authenticated with a key derived from the group key and represents values of the secret unique key and the initialization state indicator;
- decrypt the value of the data record with the key derived from the group key;
- determine an initialization status on the basis of the retrieved value of the initialization state indicator, the initialization status being selected from a list comprising at least the uninitialized state and an initialized state where a secret unique key has been generated before; and
- if the determined initialization status represents the uninitialized state,
  - generate a new value for the secret unique key,
  - send a specific value derived from the new value of the secret unique key to be received by an external validation system,
  - wait to receive a validation signal for the specific value from the external validation system, wherein the validation signal indicates that the specific value has been successfully validated by the external validation system; and
  - if a signal validating the unique secret key is received, store a new value of the data record to the non-volatile memory, wherein the said value represents the generated new value of the secret unique key and initialized state of the initialization state indicator, and wherein said value is encrypted and authenticated with the group key.

20. A device comprising a volatile FPGA and a non-volatile configuration memory according to claim 19, wherein the FPGA is configured to receive the FPGA's configuration from the configuration memory.

21. A non-transitory computer-readable medium on which is stored a configuration program comprising a bit-file that is configured to program a volatile FPGA to implement a security IP block that embeds a value for a group key and a default value of an initialization state indicator, wherein the bit-file is encrypted with a bit-file encryption that is configured to be decrypted with a hardwired decryption module embedded on the FPGA, and/or the group key is obfuscated within the bit-file, and wherein the default value represents an uninitialized state where no secret unique key has been generated before, and wherein the security IP block is further configured to:
- retrieve a value of a data record from a non-volatile memory, wherein the data record has been encrypted and authenticated with a key derived from the group key and represents values of the secret unique key and the initialization state indicator;
- decrypting the value of the data record with the key derived from the group key;
- determine an initialization status on the basis of the retrieved value of the initialization state indicator, the initialization status being selected from a list comprising at least the uninitialized state and an initialized state where a secret unique key has been generated before; and
- if the determined initialization status represents the uninitialized state,
  - generate a new value for the secret unique key,
  - send a specific value derived from the new value of the secret unique key to be received by an external validation system,
  - wait to receive a validation signal for the specific value from the external validation system, wherein the validation signal indicates that the specific value has been successfully validated by the external validation system; and
  - if a signal validating the unique secret key is received, store a new value of the data record to the non-volatile memory, wherein the said value represents the generated new value of the secret unique key and initialized state of the initialization state indicator, and wherein said value is encrypted and authenticated with the group key.

* * * * *